(12) United States Patent
Nakanishi et al.

(10) Patent No.: US 10,890,543 B2
(45) Date of Patent: Jan. 12, 2021

(54) BOOK DIGITIZATION APPARATUS AND BOOK DIGITIZATION METHOD

(71) Applicant: SHARP KABUSHIKI KAISHA, Sakai (JP)

(72) Inventors: Tohru Nakanishi, Sakai (JP); Zenken Kin, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/441,836

(22) Filed: Jun. 14, 2019

(65) Prior Publication Data

US 2019/0391089 A1 Dec. 26, 2019

(30) Foreign Application Priority Data

Jun. 25, 2018 (JP) .................................. 2018-119949

(51) Int. Cl.
*G01N 23/04* (2018.01)
*G06T 3/00* (2006.01)
*G06T 11/00* (2006.01)
*G01N 23/20* (2018.01)

(52) U.S. Cl.
CPC ............. *G01N 23/04* (2013.01); *G01N 23/20* (2013.01); *G06T 3/0031* (2013.01); *G06T 11/008* (2013.01); *G01N 2223/401* (2013.01); *G01N 2223/42* (2013.01); *G01N 2223/611* (2013.01)

(58) Field of Classification Search
None
See application file for complete search history.

(56) References Cited

U.S. PATENT DOCUMENTS

| | | | | |
|---|---|---|---|---|
| 2009/0316221 | A1* | 12/2009 | Yan | H04N 1/00795 358/474 |
| 2010/0322373 | A1* | 12/2010 | Churilla | G01N 23/046 378/4 |
| 2018/0018836 | A1* | 1/2018 | Fankhauser | G08B 13/14 |
| 2018/0202903 | A1* | 7/2018 | Chou | G01N 21/76 |
| 2018/0322372 | A1 | 11/2018 | Nakanishi et al. | |

FOREIGN PATENT DOCUMENTS

WO 2017/131184 A1 8/2017

* cited by examiner

*Primary Examiner* — Hoon K Song
(74) *Attorney, Agent, or Firm* — ScienBiziP, P.C.

(57) ABSTRACT

A book digitization apparatus includes an emitter that applies an energy ray to a book, a detector that detects an energy ray radiated from the book in response to a material existing in the book, and a three-dimensional data generator that generates data of a plurality of space points in accordance with the detected ray. The data of the space points associates position information of a position in a three-dimensional space within the book with a physical property value used to identify a layout pattern of the material at the position in a direction of thickness of the book.

7 Claims, 9 Drawing Sheets

BOOK DIGITIZATION APPARATUS AND BOOK DIGITIZATION METHOD

BACKGROUND

1. Field

The present disclosure relates to a book digitization apparatus and a book digitization method.

2. Description of the Related Art

Book digitization is desirable in view of the storage and usage of books. Frequent turning of pages of a book may damage the book. If the book is old, it may be difficult to open the book possibly because of its fragility. Book digitization free from opening the book is desirable.

International Publication No. 2017/131184 (published Aug. 3, 2017) discloses the technique of book digitization as described below. A page region corresponding to each page of a book is identified from three-dimensional (hereinafter referred to as 3D) data of the book that is acquired by applying X-ray on the book. A character string or graphics in the page region are thus mapped on a two-dimensional (hereinafter referred to as 2D) surface. In accordance with the technique, 2D page data including the character string and graphics written on the book is generated.

In accordance with the technique of the related art, a relatively longer period of time is consumed to convert the 3D data into the 2D page data.

It is desirable to increase the efficiency of the process of converting the 3D data into the 2D page data.

SUMMARY

According to an aspect of the disclosure, there is provided a book digitization apparatus. The book digitization apparatus includes an emitter that applies an energy ray to a book, a detector that detects an energy ray radiated from the book in response to a material existing in the book, and a three-dimensional data generator that generates data of a plurality of space points in accordance with the detected energy ray. The data of the space points associates position information of a position in a three-dimensional space within the book with a physical property value used to identify a layout pattern of the material at the position in a direction of thickness of the book.

According to another aspect of the disclosure, there is provided a book digitization method. A book digitization method includes applying an energy ray to a book, detecting an energy ray radiated from the book in response to a material existing in the book, and generating three-dimensionally data of a plurality of space points in accordance with the detected ray. The data of the space points associates position information of a position in a three-dimensional space within the book with a physical property value used to identify a layout pattern of the material at the position in a direction of thickness of the book.

DESCRIPTION OF THE EMBODIMENTS

First Embodiment

Embodiments of the disclosure are described below with reference to the drawings. Elements illustrated in the drawings do not reflect real shapes and dimensions (length, depth, width, and the like) and appropriately modified for clarification and simplification. Like elements are designated with like reference numerals, and the discussion thereof is not duplicated.

In the discussion that follows, for easy understanding of the book digitization apparatus of an example of the disclosure, book digitization of one embodiment is briefly described first with reference to FIGS. 1A through 3B. The book digitization apparatus of an embodiment is described in detail later.

Book Digitization

Figure 1A:
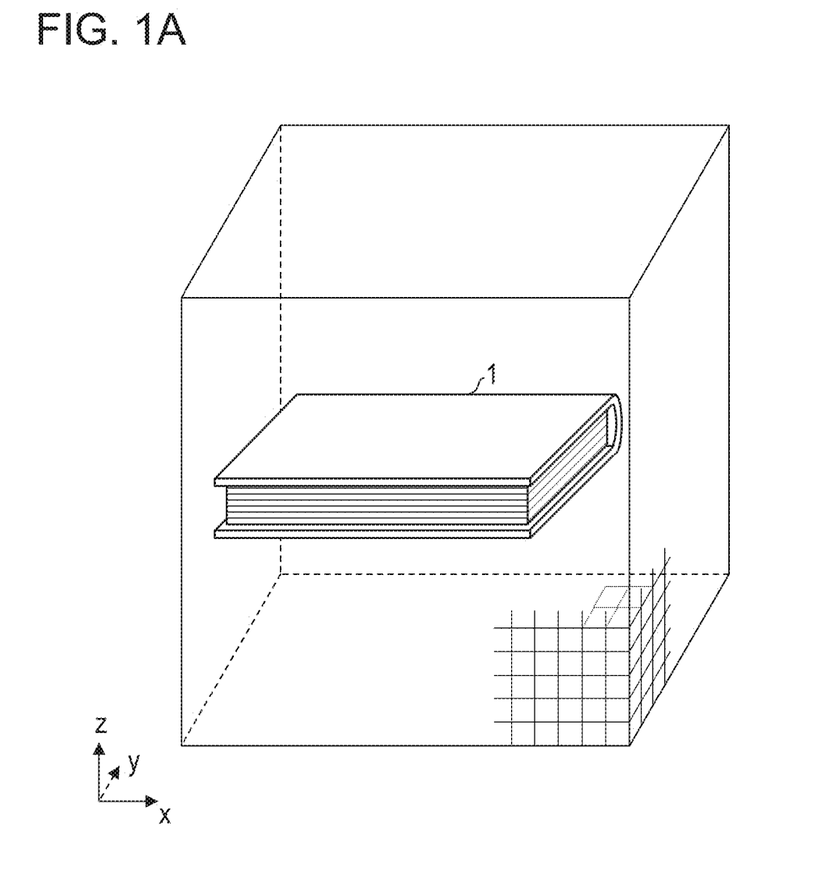
FIG. 1A is a perspective view of an example; of a book serving as a book digitization target
Figure 1B:
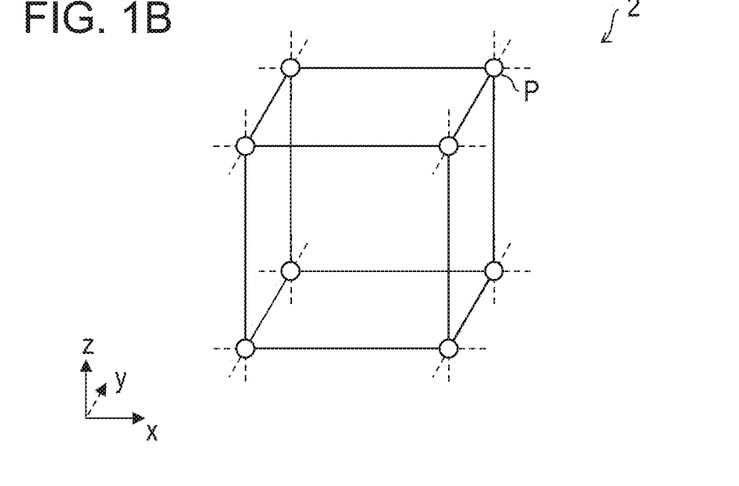
FIG. 1B is a perspective view of an example of space point data forming 3D data.

The book digitization is briefly described with reference to FIGS. 1A and 1B. FIG. 1A is a perspective view of an example of a book serving as a book digitization target. FIG. 1B is a perspective view of an example of space point data forming three-dimensional data (3D) data.

Referring to FIG. 1A, the book 1 in a closed state includes regions of multiple (paper) sheets and space regions between the sheets. The sheet has characters and the like written on the surface thereof with ink. The book 1 thus includes characters written on each sheet of paper with ink. The book 1 is digitized as described below.

The 3D data of the book 1 includes multiple sheets stacked, spaces (air) between the sheets, and information represented by ink (characters) on each sheet. The sheet is paper forming each page of the book 1. The sheets may include exposed sheets of the book 1 (a front cover and a back cover).

Referring to FIG. 1B, 3D data 2 includes a set of multiple space points P in a 3D space. In accordance with the disclosure, each space point P is referred to as a node, and each node has space point data including a coordinate value and data value. The space point data is described in detail later. For example, the coordinate value may be represented by (x,y,z). An x value, a y value, and a z value in x, y, and z axes respectively represent the position of the node (space point P) in a horizontal direction (x direction), a vertical direction (y direction), and a depth direction (z direction). In other words, the x value, the y value, and the z value respectively correspond to a distance along the x direction, a distance along the y direction, and a distance along the z direction from any position within the book 1 serving as the origin.

The book that the book digitization apparatus digitizes is not only the book 1 having a typical form of book but also written matter. For example, the written matter may be a roll of paper sheet, a book formed by binding multiple sheets, or a stack of sheets that are not bound. The material of the sheets of the book includes but is not limited to paper. For example, the sheets are manufactured of plastic. The written matter may be one or more overhead projector (OHP) sheets or a variety of types of papers (such as papyrus or parchment) with characters written thereon.

Each sheet of the book has codes that are written thereon including characters, graphics, and symbols by using ink. The codes are meaningful information that is conveyed on the book as a medium. The material used to write the meaningful information is not limited to ink. The meaningful information is written by using, for example, a pigmented ink. Furthermore, the materials used to write the meaningful information may be graphite, paint, or color. The material of the medium on which the codes are written is not limited to any particular type. The density of the codes (such as the character color) may be lighter or deeper.

In the digitization of the book 1, the meaningful information written on the sheet is extracted in a recognizable form, and the three-dimensional (3D) data is converted into page data that is two-dimensional (2D or plane) data. Exact extraction of the meaningful information is typically difficult in the process of converting the 3D data into the 2D data. In addition, the speed (or efficiency) of the process is desirably increased.

Book Digitization

Figure 2:
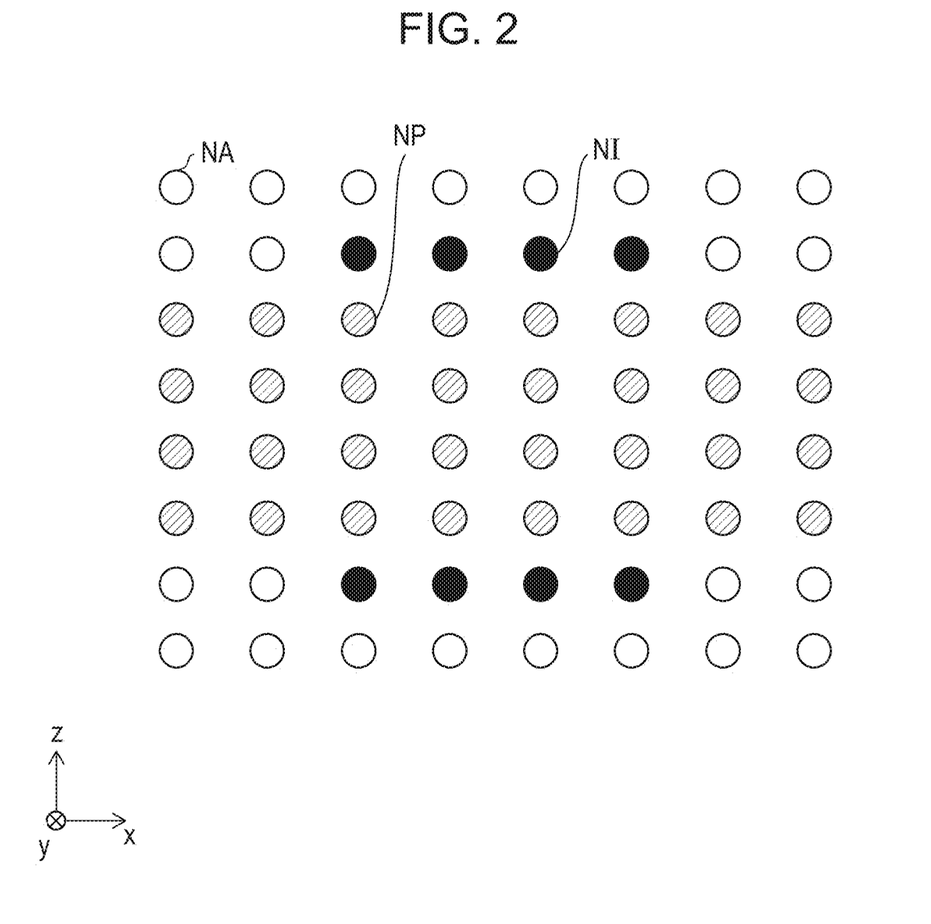
FIG. 2 is a schematic sectional view of nodes distributed around a sheet in a cross-section parallel with the direction of thickness of the book.

Book digitization of a first embodiment of the disclosure is described with reference to FIGS. 2, 3A and 3B. FIG. 2 is a schematic sectional view of nodes distributed around a sheet in a cross-section parallel with the direction of thickness of the book 1.

Referring to FIG. 2, the 3D data 2 of the book 1 includes nodes NA of an air layer (blank circles), nodes NP of a paper sheet (hatched circles), and nodes NI of an ink layer (solid circles). Each node has space point data. A data value of the space point data is a scalar value responsive to a material at the corresponding location.

Resolution of the 3D data 2 is sufficiently smaller than each of the thickness of one sheet of the book 1 and a space between the pages. Specifically, the distance between the adjacent nodes (increments of the coordinates) is sufficiently smaller than each of the thickness of the paper sheet and the space between the adjacent paper sheets. The resolution of the 3D data 2 is desirably high enough to discriminate the characters written in the book 1. For simplicity of the drawings, the thickness of the paper sheet, the thickness of the ink layer, and the width of the ink layer are illustrated in a size larger than the life size thereof as illustrated in FIG. 2.

In the example of FIG. 2, the ink nodes NI are present beneath and on top of the paper nodes NP. This means that characters are written on both sides of a paper sheet. In accordance with the first embodiment, the z direction of the 3D data 2 corresponds to the thickness direction of the book 1. In the 3D data 2 of the book 1, the air nodes NA, the ink nodes NI, and the paper nodes NP are present in a layout pattern along the z direction. The layout pattern may vary with different x and y values.

For comparison purposes, a related art technique is described. The 3D data of a 3D object may be generated by using X-ray computerized tomography scanning technique of the related art. Specifically, the 3D data (3D image) representing a 3D object may be generated by imaging the 3D object with an X-ray phase contrast computerized tomography apparatus. Each node in the 3D data has a scalar value responsive to absorptivity of a material responsive to the X-ray. If the 3D data is generated through the X-ray CT scanning, an accuracy level of the book digitization could be insufficient. In other words, the meaningful information is difficult to accurately recognize through converting the 3D data into the 2D data.

Figure 3A:
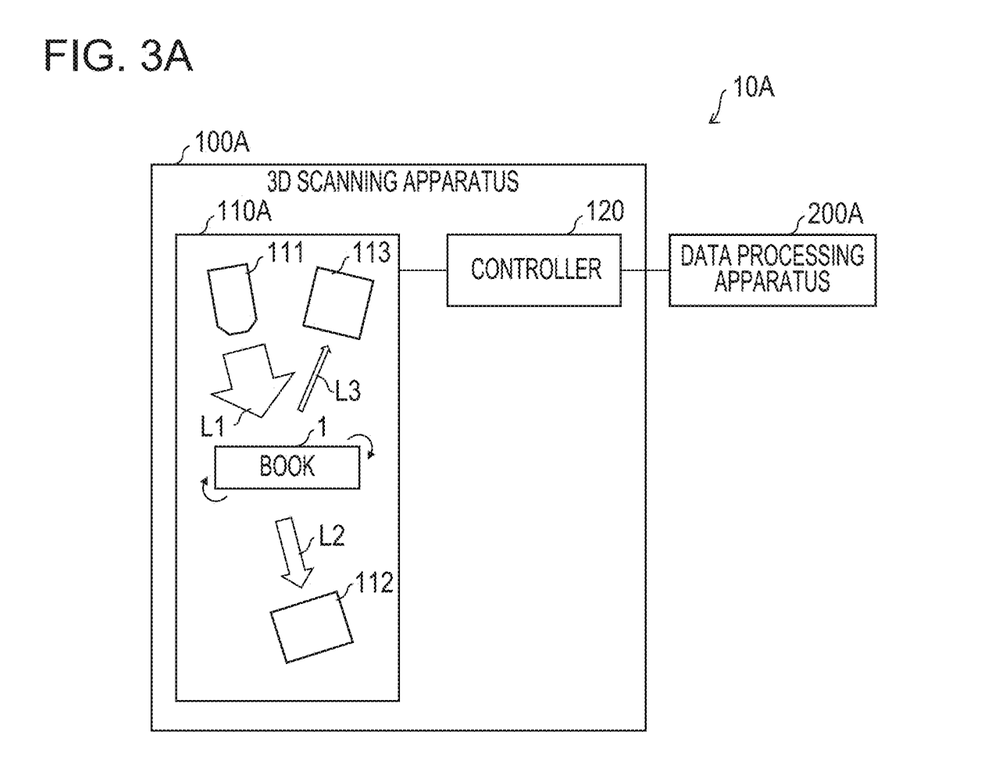
FIG. 3A is a block diagram schematically illustrating of a book digitization apparatus of a first embodiment of the disclosure and FIG. 3B is a block diagram illustrating a modification of a scanner in the book digitization apparatus.
Figure 3B:
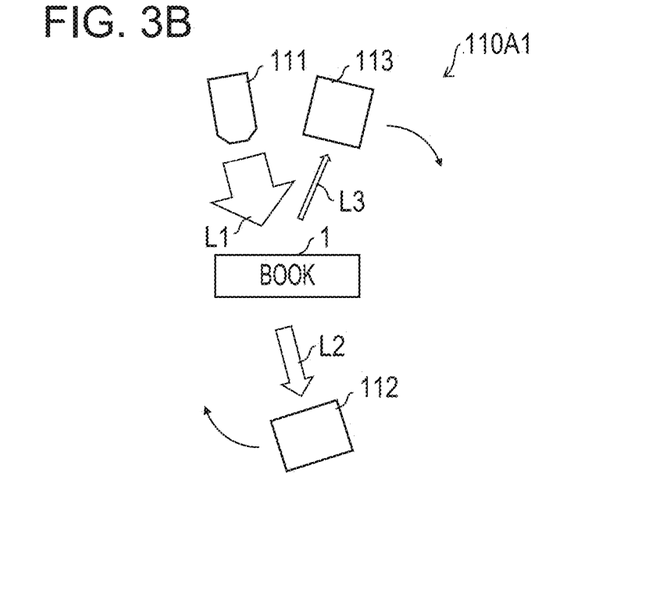

FIGS. 3A and 3B summarize the concept of a book digitization apparatus 10A of the first embodiment provided by the inventors of the technique of the disclosure. FIG. 3A is a block diagram schematically illustrating the book digitization apparatus 10A of the first embodiment.

Referring to FIG. 3A, the book digitization apparatus 10A includes a 3D scanning apparatus 100A and a data processing apparatus 200A. The 3D scanning apparatus 100A includes a scanner 110A and a controller 120. The controller 120 and the data processing apparatus 200A in the book digitization apparatus 10A are described in detail later.

The scanner 110A includes an X-ray emitter (emitter) 111, a transmitted light detector (first detector) 112, and a reflected light detector (second detector) 113. The X-ray emitter 111 emits an X-ray (radiation X-ray L1) to the book 1. The transmitted light detector 112 detects an X-ray transmitted through the book 1 (transmitted X-ray L2). The reflected light detector 113 detects an X-ray reflected from a material forming the book 1 (reflected X-ray L3).

The transmitted light detector 112 and the reflected light detector 113 detect X-rays (radiation energy rays) radiated from the book 1 in response to the material within the book 1.

The book 1 is supported by a drive mechanism (not illustrated). The book 1 is thus rotatable in the direction denoted by two arrows. The book 1 is movable from, the front to rear in a direction perpendicular to the page of FIG. 3A. Specifically, the scanner 110A is designed to irradiate the book 1 with the X-ray such that the book 1 is three-dimensionally scanned.

When the book 1 is rotated, the x, y, and z axes representing coordinate of the nodes also rotate in synchronization with the book 1. This is because position information (coordinate values) in the space point data of the nodes correspond to materials forming the book 1. The z direction remains aligned with the direction of thickness of the book 1.

The scanner 110A in the book digitization apparatus 10A of the first embodiment includes the reflected light detector 113. The book digitization apparatus 10A is designed to detect the phenomenon, of reflection (interface reflection) and diffraction of the X-ray. The book 1 clearly has a difference between the refractive index of the air layer and the refractive index of the paper sheet, a difference between the refractive index of the paper sheet and the refractive index of the ink layer, and a difference between the refractive index of the air layer and the refractive index of the ink layer. The reflected light detector 113 may acquire information used to determine an interface between the air layer and the paper sheet, an interface between the paper sheet and the ink layer, and the air layer and the ink layer (namely, information on the layout pattern). By using the information, the book digitization apparatus 10A of the first embodiment may more accurately and efficiently recognize the number of pages and characters in the book 1.

Modification of Scanner

The book 1 is rotatable in the scanner 110A illustrated in FIG. 3A. The method of three-dimensionally scanning the book 1 is not limited, to any particular mechanism. For example, the scanner 110A may be a scanner 110A1 as described below. FIG. 3B is a block diagram illustrating a modification of the scanner 110A in the book digitization apparatus 10A.

Referring to FIG. 3B, a gantry of a related art CT scanning apparatus supports the X-ray emitter 111, the transmitted light detector 112, and the reflected light detector 113 in the scanner 110A.1. The book 1 is three-dimensionally scanned when the X-ray emitter 111, the transmitted light detector 112, and the reflected light detector 113 are rotated around the book 1.

Book Digitization Apparatus

The book digitization apparatus 10A of the first embodiment is described in detail as below with reference to FIGS. 4 through 6.

In accordance with the first embodiment, the book digitization apparatus 10A uses the X-ray as an energy ray to be emitted to the book 1. The energy ray is not limited to the X-ray. The energy ray may be a terahertz wave, an infrared light ray, a visible light ray, or the like. The energy ray may be selected depending on the type of book serving as a digitization target. If a transparent OHP sheet having characters written thereon is to be digitized, the visible light ray may be used as the energy ray.

The book digitization apparatus of the first embodiment detects the reflected X-ray L3 with the reflected light detector 113 in the scanner 110A mounted in a positional relationship as illustrated in FIG. 3A. The method of detecting reflectivity of the book 1 is not limited to any particular method. For example, an X-ray reflectivity measurement technique of the related art may be used. The X-ray emitter 111 and the reflected light detector 113 may be arranged in a positional relationship different from the positional relationship illustrated in FIG. 3A (see FIG. 8 described later).

Figure 4:
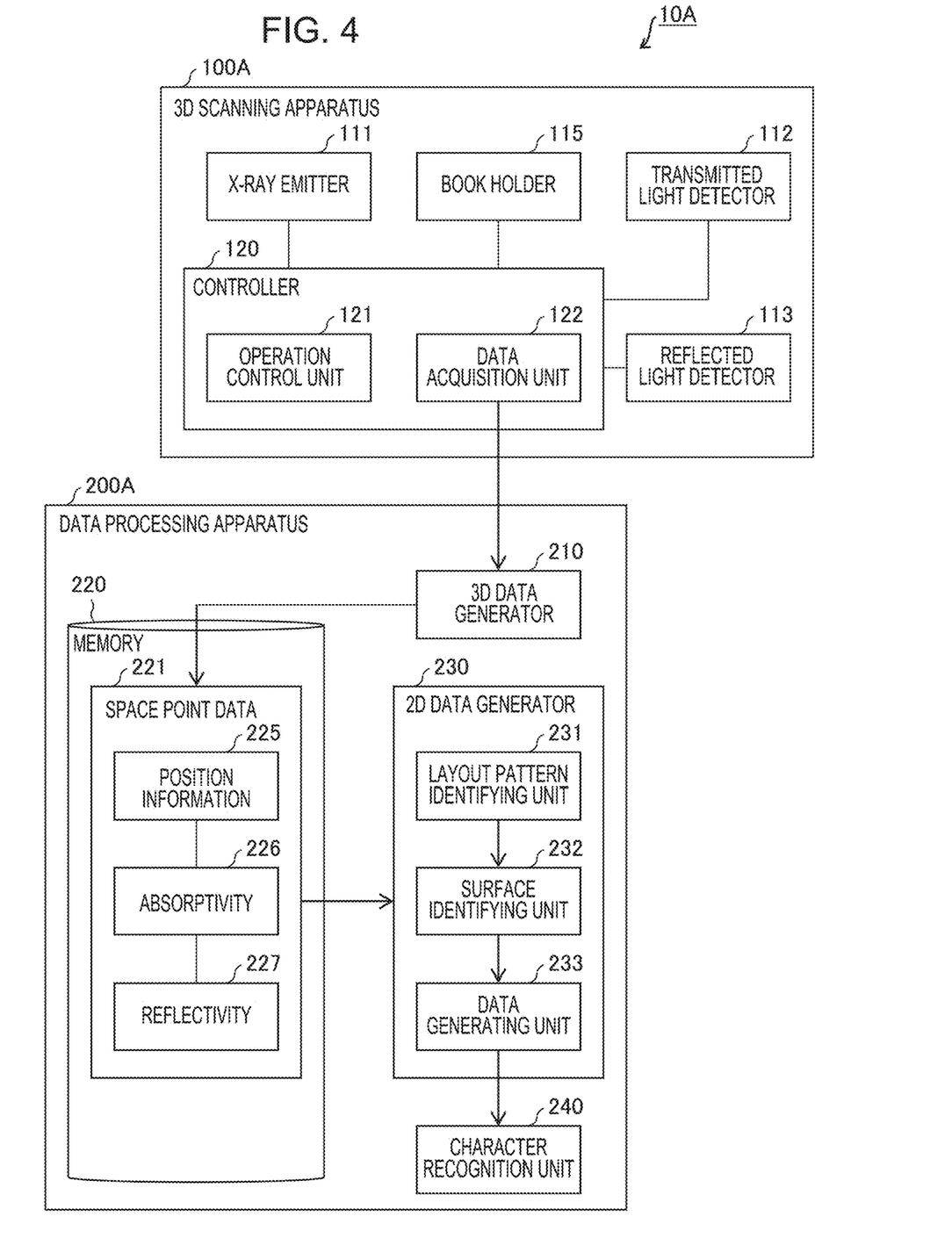
FIG. 4 is a block diagram, schematically illustrating the book digitization apparatus of the first embodiment of the disclosure.

FIG. 4 is a block diagram schematically illustrating the book digitization apparatus 10A of the first embodiment. Referring to FIG. 4, the book digitization apparatus 10A includes the 3D scanning apparatus 100A and the data processing apparatus 200A. 3D scanning apparatus The 3D scanning apparatus 100A includes a book holder 115 in addition to the elements described with reference to FIGS. 3A and 3B. The controller 120 includes an operation control unit 121 and a data acquisition unit 122.

The book holder 115 holds the end portion of the closed book 1 with clamps, and a mechanism (not illustrated) in the book holder 115 is able to rotate the book 1. The book holder 115 is designed to rotate the book 1 with the book 1 irradiated with the X-ray such that the book 1 is three-dimensionally scanned. The mechanism of this operation is not limited to any particular mechanism.

The X-ray emitter 111, the transmitted light detector 112, the reflected light detector 113, and the book holder 115 in the 3D scanning apparatus 100A form the scanner 110A (see FIGS. 3A and 3B).

X-Ray

The radiation X-ray L1 emitted by the X-ray emitter 111 may have any bean shape, for example, may be a single beam, a fan beam, or a cone beam. The peak wavelength of the X-ray may fall within a range from about 0.1 nm to about 10 nm. An appropriate peak wavelength of the X-ray may be selected depending on the material of the ink layer.

The radiation X-ray L1 may be a characteristic X-ray emitted from an X-ray source. Alternatively, the X-ray may be a particular wavelength portion that is extracted from a continuous X-ray by using a filter or the like. The X-ray emitted by the X-ray emitter 111 may have a fixed or variable peak wavelength.

The X-ray emitter 111 may be a parallel (collimated) beam that is obtained by using a multilayer film. The X-ray may be output in the form of pulsed light.

Transmitted Light Detector

The transmitted light detector 112 may be a related art device used in the related art X-ray CT scanning. The mounting method of one of a variety of X-ray CT scanning systems of the related art (the first generation to the fourth generation X-ray CT systems) may be applied to the installation of the transmitted light detector 112. The transmitted light detector 112 is briefly described here. The transmitted light detector 112 is constructed by two-dimensionally laying out detector units at a predetermined pitch in accordance with the radiation form (such as a fan beam) of the X-ray from the X-ray emitter 111.

Reflected Light Detector

The reflected light detector 113 is designed to detect the reflected X-ray L3 from the material forming the book 1 when the book 1 is irradiated with the radiation X-ray L1. The reflected light detector 113 is not limited to any particular configuration. The reflected X-ray L3 may be an X-ray produced via Thomson scattering on the material forming the book 1.

The reflected X-ray L3 is described with reference to FIGS. 5A and 5B. FIG. 5A is a cross-sectional view of the book 1 indicating how the radiation X-ray L1 having entered the book at a location of the book is partially transmitted and reflected. FIG. 5B is a cross-sectional view of the book 1 indicating how the radiation X-ray L1 having entered the book at another location of the book is partially transmitted and reflected. The state illustrated in FIG. 5A is referred to as a state α and the state illustrated in FIG. 5B is referred to as a state β.

Figure 5A:
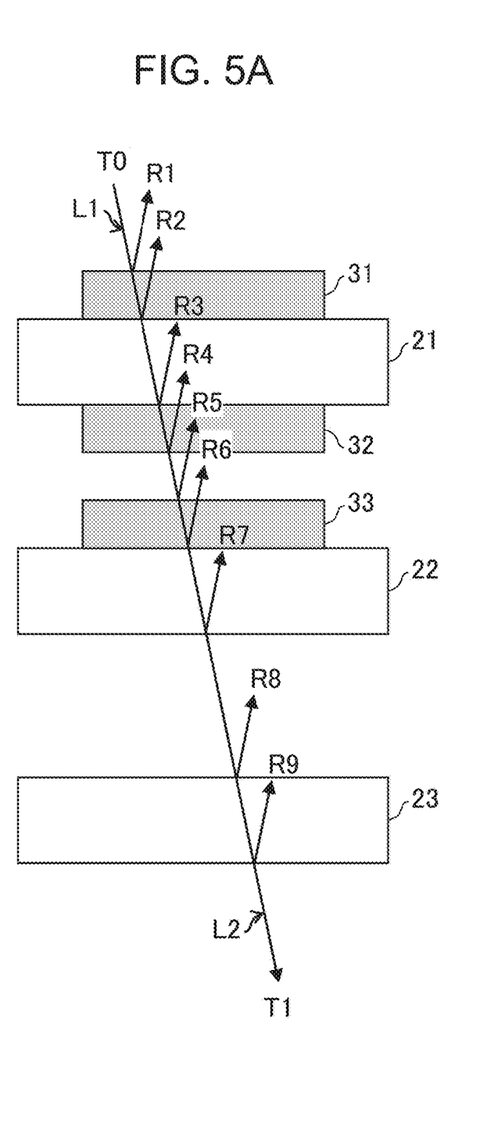
FIG. 5A is a cross-sectional view of a book indicating how a radiation X-ray having entered the book at a location of the book is transmitted and reflected.
Figure 6:
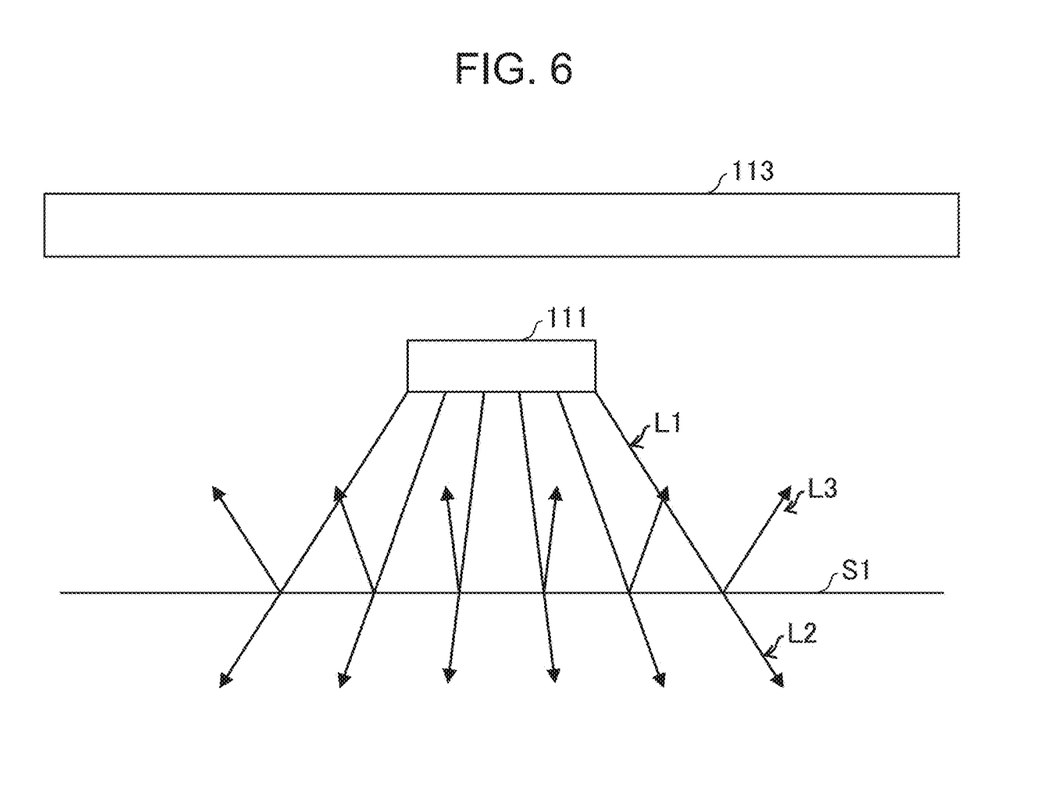
FIG. 6 illustrates a modification of a reflected light detector in the book digitization apparatus.

Referring to FIG. 5A, the radiation X-ray L1 at an intensity of T0 is incident on the book 1 and is transmitted through three paper sheets 21 through 23 and three ink layers 31 through 33. The radiation X-ray L1 is attenuated through the transmission and output as the transmitted X-ray L2 at an intensity of T1. In the region of the book 1 illustrated in FIG. 5A, the ink layer 31 is in contact with the top surface of the paper sheet 21, and the ink layer 32 is in contact with the bottom surface of the paper sheet 21. The ink layer 33 is in contact with the top surface of the paper sheet 22.

Let $n_{air}$ represent the refractive index of the air layer, $n_{ink}$, the refractive index of the ink layer, and R1, the reflectivity of the interface between the air layer and the ink layer 31 in response to the X-ray, and the reflectivity R responsive to a vertically incident X-ray is represented by the following equation:

$$R=(n_{air}-n_{ink})^2/(n_{air}+n_{ink})^2$$

Figure 5B:
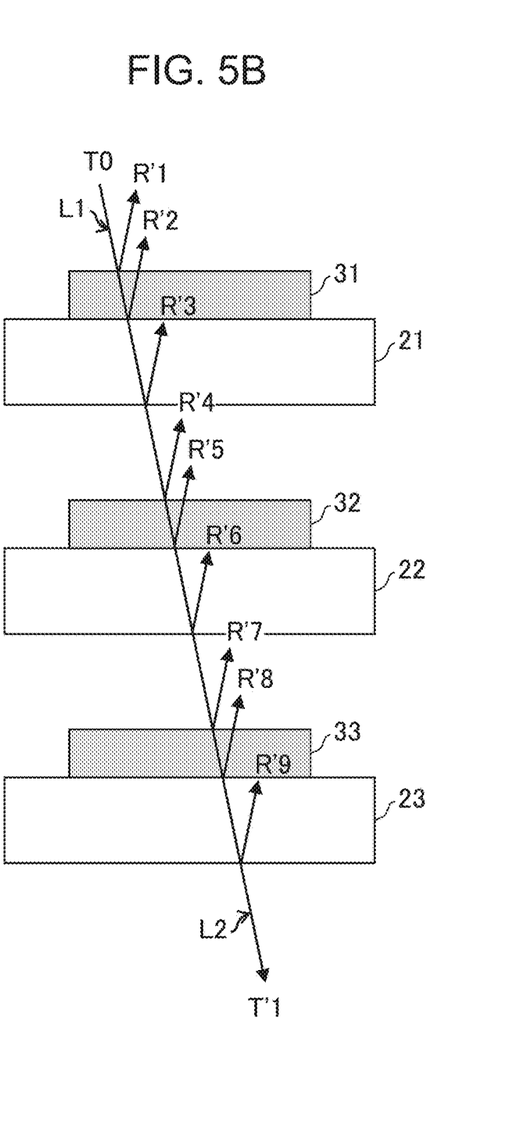
FIG. 5B is a cross-sectional view of a book indicating how a radiation X-ray having entered the book at another location is transmitted and reflected.

The reflectivity responsive to the obliquely incident radiation X-ray L1 as illustrated in FIGS. 5A and 5B may be calculated in accordance with the theoretical equation of the related art. Since the radiation X-ray L1 attenuates more at a deeper location in the book 1, the intensity of the reflected X-ray L3 decreases.

Values of reflectivity of the air layer, the ink layer, and the paper sheet on other interfaces are similarly obtained. As illustrated in FIGS. 5A and 5B, Rx denotes the reflectivity. The extension line of the radiation X-ray L1 crosses each x-th interface between adjacent layers from, top to bottom of the book 1 where x is an integer ranging from 1 to 9.

In the stage β illustrated in FIG. 5B, the ink layer 31 is in contact with the top surface of the paper sheet 21, the ink layer 32 is in contact with the top surface of the paper sheet 22, and the ink layer 33 is in contact with the paper sheet 23. The radiation X-ray L1 at an intensity of T0 is incident on the book 1, is transmitted through the three paper sheets 21 through 23 and the ink layers 31 through 33, and is output as the transmitted X-ray L2 at an attenuated intensity of T'1. In this case, R'x denotes the reflectivity at each of the interfaces.

In each of the state α and the stage β, a total number of reflections at the interfaces is 9. The intensity T1 equals the intensity T'1, and the overall reflectivity in response to the X-ray in the state α equals the overall reflectivity in response to the X-ray in the state β. The values of reflectivity of the interfaces are described as follows: R1=R'1, R2=R'2, R9=R'9, R3≠R'3, R4≠R'4, R5≠R'5, R6≠R'6, R7≠R'7, and R8≠R'8.

The overall absorptivity in the state α equals the overall absorptivity in the stage β. The reflectivity in the state α equals the overall absorptivity in the stage β. The difference between the state α and the stage β is easily recognized by finding differences between the values of reflectivity of the interfaces.

Specifically, a layout pattern of the ink layers and the paper sheets in the direction of thickness of the book 1 may be easily identified by using information on the reflectivity of the material forming the book 1 (in particular, the reflectivity of each interface of the book 1). The layout pattern is a pattern (sequence order) of the air layer, the ink layer, and the paper sheet, such as the air layer, an ink layer, a paper sheet, an ink layer, the air, a paper sheet, . . . stacked in that order.

A node present in an interface has information (scalar value) related to reflectivity, and another portion (for example, a node within the paper sheet) has no or little amount of data on reflectivity.

The reflected light detector 113 may be simply mounted to detect the X-ray radiated from each of the interfaces.
Modification of Reflected Light Detector The shape and mounting location of the reflected light detector 113 are determined depending on how the radiation X-ray L1 is to be emitted from the X-ray emitter 111 onto the book 1. FIG. 6 illustrates a modification of the reflected light detector 113. Referring to FIG. 6, the X-ray emitter 111 may emit the radiation X-ray L1 onto the book 1 in a fan beam, or a cone beam. At an interface S1, the X-ray L2 is transmitted in a variety of directions while the X-ray L3 is reflected in a variety of directions. In order to detect the reflected X-ray L3, the reflected light detector 113 is mounted in a wide area behind the X-ray emitter 111.
Controller The controller 120 controls the entire operation of the 3D scanning apparatus 100A as illustrated in FIG. 4.

The operation, control unit 121 controls the operation of each of the X-ray emitter 111, the transmitted light detector 112, the reflected light detector 113, and the book, holder 115. In accordance with the first embodiment, the operation control unit 121 controls these elements such, that the book holder 115 rotates the book 1 to three-dimensionally scan the book 1. The X-ray is thus emitted to the book 1. The X-ray thus transmitted through and reflected from, the book 1 are detected.

The data acquisition unit 122 acquires data from the transmitted light detector 112 and the reflected light detector 113 and transmits the acquired data to the data processing apparatus 200A. The data acquisition unit 122 may temporarily store the acquired data or may perform any pre-process on the acquired data. The data acquisition unit 122 is not limited to any particular configuration.
Data Processing Apparatus The data processing apparatus 200A includes a 3D data generator 210, a memory 220, a 2D data generator 230, and a character recognition unit 240. The memory 220 stores space point data 221. The space point data 221 associates position information 225 of the material forming the book 1 with absorptivity 226 and reflectivity 227. The 2D data generator 230 includes a layout pattern identifying unit 231, a surface identifying unit 232, and a data generating unit 233.

The 3D data generator 210 receives the data transmitted from the data acquisition unit 122. The 3D data generator 210 generates the 3D data 2 (see FIG. 1B) by using the received data.

In the 3D data 2 generated by the 3D data generator 210, each node has a coordinate value and a physical property value. The space point data of the node is represented by (x, y, z, $k_{xyz}$). (x, y, z) denotes coordinate values, and corresponds to the position information 225. $k_{xyz}$ denotes a physical property value and at least includes information on the reflectivity 227 in the first embodiment. It is noted that in the X-ray CT scanning of the related art, $k_{xyz}$ is a scalar value including information on only the absorptivity.

In the book digitization apparatus 10A of the first embodiment, the physical property value may include the absorptivity 226 in addition to the reflectivity 227. In such a case, $k_{xyz}$ may include $k1_{xyz}$ denoting the absorptivity and $k2_{xyz}$ denoting the reflectivity. $k1_{xyz}$ and $k2_{xyz}$ are scalar values of a material present at a given position. For example, $k1_{xyz}$ denoting the absorptivity is a data value ranging from 0 to 10 (inclusive). A data value equal to 6 or above and below 9 may correspond to the ink layer, a data value equal to 3 or above and below 6 may correspond to the paper sheet, and a data value equal to 0 or above and below 3 may correspond to the space (air layer) between the paper sheets. The range of a data value for $k2_{xyz}$ representing the reflectivity may be set in accordance with the state of the interface, for example, the state of how the X-ray is reflected from the interface.

The data value responsive to the material (a relationship between the data value and the material) may be three-dimensionally determined by using a sample of book.

The 3D data generator 210 generates the space point data 221 by computing the physical property value in accordance with a technique of the related art. For example, an image reconstruction technique typically used in the X-ray CT scanning may be used to compute the reflectivity.

The space point data 221 generated by the 3D data generator 210 is transmitted to the memory 220 for storage. When the paper sheet 21 is stored, the position information 225 is associated with the absorptivity 226, and the reflectivity 227. The memory 220 may be included in the data processing apparatus 200A. Alternatively, the memory 220 may be external to the data processing apparatus 200A. In such a case, the data processing apparatus 200A is communicably linked with the memory 220.

The 2D data generator 230 reads the space point data 221 from the memory 220 and performs an arithmetic operation on the space point data 221 in order to generate 2D page data. Elements included in the 2D data generator 230 are described together with the book digitization apparatus 10A.

The character recognition unit 240 recognizes characters (meaningful information) written on pages of the book 1 in accordance with the 2D page data.

Process Performed by Book Digitization Apparatus

Figure 7:
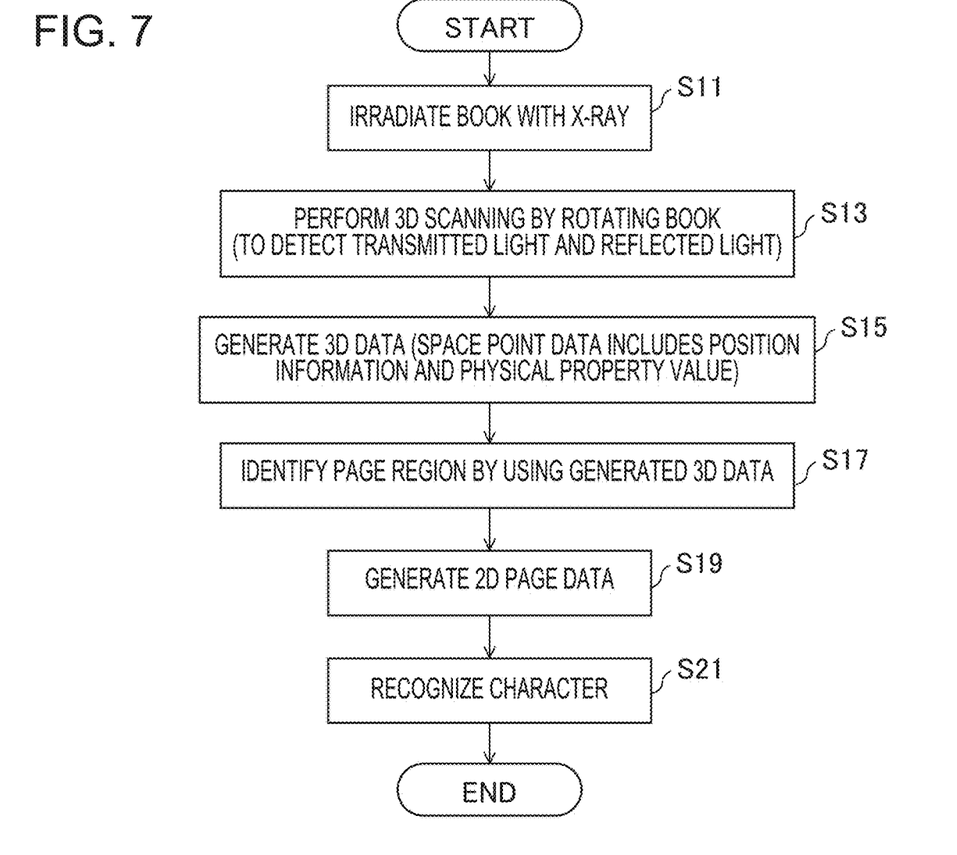
FIG. 7 is a flowchart illustrating a process performed by the book digitization apparatus.

The process (book digitization method) performed by the book digitization apparatus 10A of the first embodiment is described with reference to FIG. 7. FIG. 7 is a flowchart illustrating the process performed by the book digitization apparatus 10A.

Referring to FIG. 7, the X-ray emitter 111 irradiates the book 1 held by the book holder 115 with the X-ray (energy ray) in an emission operation (step S11).

The book 1 is three-dimensionally scanned by irradiating the book 1 with the X-ray and by rotating the book 1 with the book holder 115. Specifically, the transmitted light detector 112 detects the transmitted X-ray L2 and the reflected light detector 113 detects the reflected X-ray L3 in a detection operation (S13).

Based on the detected data, the 3D data generator 210 performs an arithmetic operation. The 3D data generator 210 thus computes the space point data 221 corresponding to each of a large number of nodes forming the 3D data 2 of the book 1 in a 3D data generation operation (S15). In other words, multiple pieces of the space point data 221 generated associate the position information 225 with the physical property values (the absorptivity 226 and the reflectivity 227) corresponding to the material at a corresponding location in accordance with the X-rays detected by the transmitted light detector 112 and the reflected light detector 113. The position information 225 is information on a position in the 3D space within the book 1. The physical property value relates to the material at the position indicated by the position information 225 and is used to identify the layout pattern of the materials in the direction of thickness of the book 1.

The 2D data generator 230 generates the 2D page data by using the 3D data 2 generated by the 3D data generator 210.

Specifically, the layout pattern identifying unit 231 identifies the layout pattern of the air layers, the ink layers, and the paper sheets in the direction of thickness of the book 1 at a position on a 2D surface (in the direction along which the z values vary with the x value and y values fixed), by using information included in the space point data 221 and the reflectivity 227.

The surface identifying unit 232 identifies a page region by using the 3D data 2 (S17). A technique of the related art, such as the technique disclosed in International Publication No. 2017/131184, may be applied to the operation of identifying the page region. If briefly discussed, the surface identifying unit 232 identifies as the page region a region that includes in the 3D data 2 a set of nodes with the absorptivity 226 having the data values falling within the value range of the paper sheet. In other words, the surface identifying unit 232 identifies the page region by searching for an equal-value plane.

The surface identifying unit 232 may identify the page region by supplementally using the information on the reflectivity 227. In this way, the identification accuracy level of identifying the interface between the paper sheet and the air layer may be increased and the speed of the identification process may be increased.

The data generating unit 233 generates the 2D page data by using the 3D data 2, the information on the page region, and the information on the layout pattern identified as described above (S19). The 2D page data may be digitized information of each page of the book 1 and may be digital data representing the image of each paper sheet having characters written thereon. The 2D page data may include other meaningful information in addition to characters. The meaningful information on a given page may be represented by the layout of the ink nodes NI corresponding to the ink layer.

The data generating unit 233 identifies where the ink layer is present (the ink node NI is present) in the 2D surface in a given page region. The position of the ink node NI is accurately identified by using the information on the reflectivity 227 included in the 3D data 2 and the information on the layout pattern. The process speed may thus be increased. The data generating unit 233 may extract the information on the ink layer rather than the information on the paper sheet.

When a paper sheet of the book 1 is bent (in particular, when the book 1 is older or is a roll of paper sheet), the identified page region may be a curved surface in the 3D space. Even in such a case, the data generating unit 233 may generate the 2D page data by mapping the data values of the page region on the 2D surface. The mapping method used may be a method of the related art (such as unfolding 3D meshes using saddle point features).

The character recognition unit 240 recognizes characters in accordance with the 2D page data (S21). The character recognition unit 240 may extract the characters from, the 2D page data by performing pattern, matching and may convert the extracted characters into text data (character Modifications (a) A modification of the book digitization apparatus 10A of the first embodiment may include a unitary apparatus into which the transmitted, light detector 112 and the reflected light detector 113 are integrated. For example, the detectors may be arranged, in a circle surrounding the book 1. In the modification of the book digitization apparatus 10A, the X-ray emitter 111 rotates inside the detectors to three-dimensionally scan the book 1.

(b) The book digitization apparatus 10A may not necessarily have to include the character recognition unit 240. In such a case, the 2D page data generated by the book digitization apparatus 10A may be displayed by using a display, such as a liquid-crystal display. A user may view the display, there by recognizing the characters.

Figure 8:
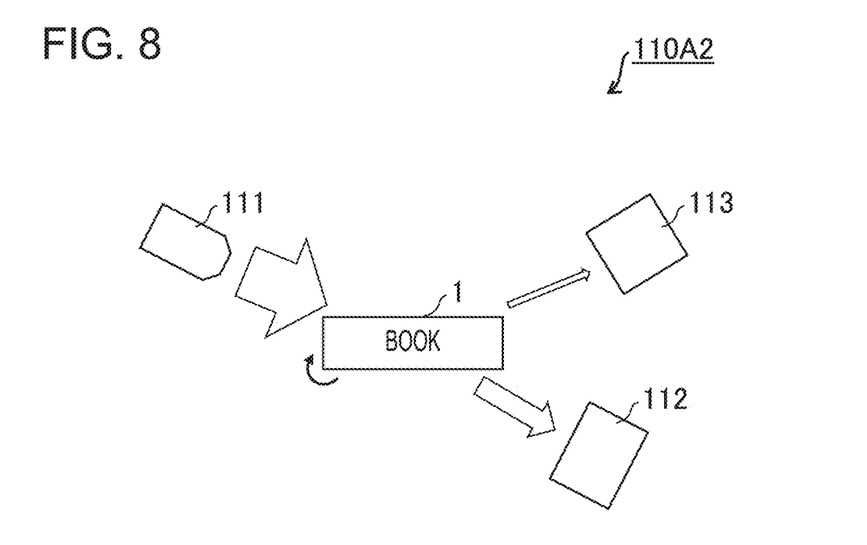
FIG. 8 is a block diagram schematically illustrating a scanner of a modification of the book digitization apparatus.

(c) In another modification of the book digitization apparatus 10A, the book 1 may be scanned by using an X-ray reflectivity measurement method of the related art. FIG. 8 is a block diagram schematically illustrating a scanner 110A2 in the modification of the book digitization apparatus 10A.

Referring to FIG. 8, the scanner 110A2 is mounted in a manner such that an angle made between the radiation X-ray L1 emitted from the X-ray emitter 111 to the book 1 and the reflected X-ray L3 is an appropriate angle equal to about 170° or more. The transmitted light detector 112 is mounted at a location where the transmitted X-ray L2 transmitted through the book 1 is incident on.

With the book 1 rotated, the scanner 110A2 emits the radiation X-ray L1 on an interface at an angle in excess of a total reflection critical angle. In such a case, the intensity of the reflected X-ray L3 increases. The reflected light detector 113 may more easily detect the reflected X-ray L3. The radiation X-ray L1 used is desirably pulsed light. The reflected light detector 113 may acquire information on an output location of the detected reflected X-ray L3 through time resolving based on a time difference between optical paths.

(d) In another modification of the book digitization apparatus 10A, an X-ray diffraction technique of the related art may be used. For example, a technique of the related art, such as micro X-ray diffraction technique, may be used. The controller 120 causes the X-ray emitter 111 and the reflected light detector 113 to operate to measure X-ray diffraction. The data generating unit 233 identifies a position (coordinate values) more likely to be an ink layer by analyzing the 3D data 2. In accordance with the information on the a diffraction pattern obtained via the X-ray diffraction measurement, the data generating unit 233 more accurately determines whether the position corresponds to an ink layer. If the ink layer is manufactured of a type of ink containing metallic particles of a metal, a determination as to whether the position corresponds to the ink layer is made by identifying the metal. The data generating unit 233 may also identify a portion of the paper sheet.

In another modification of the book digitization apparatus 10A, an in-plane X-ray diffraction (XRD) technique may be used. In such a case, the X-ray emitter 111, the book 1, and the reflected light detector 113 are mounted in an appropriate positional relationship. The controller 120 adequately controls these elements such that in-plane XRD is measured. In accordance with the information on the obtained diffraction pattern, the data processing apparatus 200A may identify the material or acquire thickness information. The information on the layout pattern may be acquired by moving the X-ray emitter 111 and the reflected light detector 113 with respect to the book 1 along the z direction.

(e) In another modification of the book digitization apparatus 10A, the transmitted light detector 112 may detect a diffracted X ray that is radiated from the book 1 when the radiation X-ray L1 refracts at the book 1. The layout-pattern identifying unit 231 may identify the layout pattern at a higher accuracy level in accordance with the information on the incident angle of the radiation X-ray L1 and the information on the position and intensity of the refracted X-ray detected by the transmitted light detector 112.

(f) In another modification of the book digitization apparatus 10A, the book 1 may be rotated and the X-ray emitter 111, the transmitted light detector 112, and the reflected light detector 113 may be moved in the scanner 110A. In such a case, the book 1 may be irradiated with the X-ray at a variety of angles. In each of the modifications (d) and (e), diffracted or refracted X-ray may be more appropriately acquired.

Second Embodiment

A second embodiment of the disclosure is described with reference to FIGS. 9 and 10. Only a difference between the first embodiment and the second embodiment is described below. For convenience of explanation, elements identical to those illustrated in connection with the first embodiment are designated with the same reference numerals and the discussion thereof is not duplicated.

In the book digitization apparatus 10A of the first embodiment, the 2D data generator 230 generates the 2D page data by using the information on the reflectivity 227 in the space point data 221. In contrast, in a book digitization apparatus 10B of the second embodiment, the 2D data generator 230 generates the 2D page data by using optical data 229 in addition to the reflectivity 227.

Book Digitization Apparatus

Figure 9:
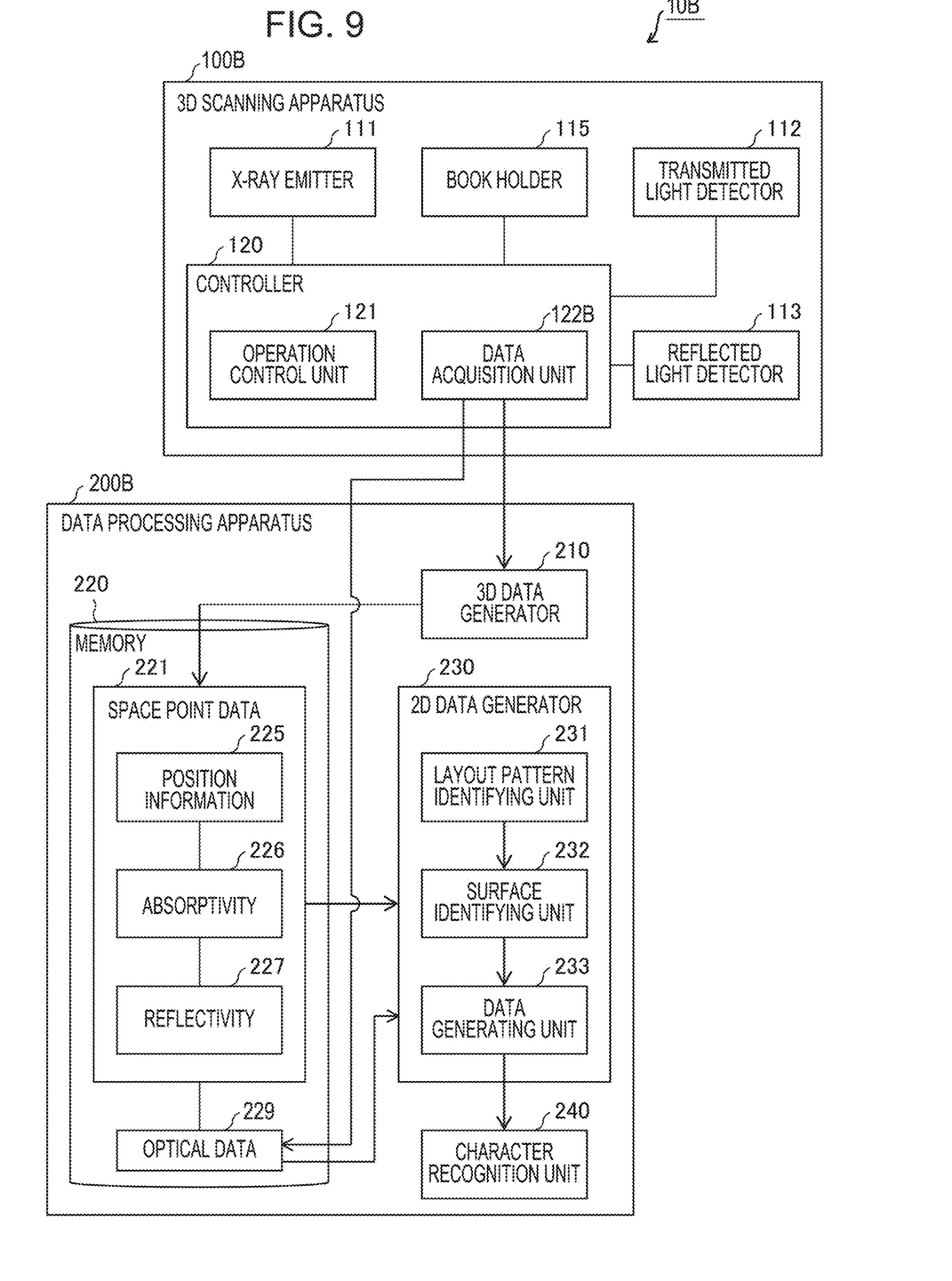
FIG. 9 is a block diagram schematically illustrating a book digitization apparatus of a second embodiment of the disclosure.

FIG. 9 is a block diagram schematically illustrating the book digitization apparatus 10B of the second embodiment of the disclosure. Referring to FIG. 9, the book digitization apparatus 10B includes a 3D scanning apparatus 100B and a data processing apparatus 200B.

The controller 120 in the 3D scanning apparatus 100B includes a data acquisition unit 122B. The data acquisition unit 122B transmits to the 3D data generator 210 data received from, the transmitted light detector 112 and the reflected light detector 113. In accordance with the data, the data acquisition unit 122B generates the optical data 229 and stores the generated optical data 229 on the memory 220. Specifically, the data acquisition unit 122B acquires information on interface reflectivity, overall absorptivity, a phase difference, and the like in a step of the 3D scanning of the book 1. The data acquisition unit 122B acquires the information in all steps of the 3D scanning and generates the optical data 229 in accordance with the acquired information.

The optical data 229 includes interface identifying information used to identify each interface in a layer structure of the book 1 and correlates with, the space point data 221. The layer structure of the book 1 is formed by stacking the paper sheets in the direction of thickness of the book 1. "Identifying each, interface" is identifying a page region. In the following discussion, the layer is also referred to as a "film."

The interface identifying information includes at least one of an interface reflectivity value, an overall absorptivity value, and an incident angle.

The 2D data generator 230 may acquire the information on the thickness of each film (the thickness of each paper sheet), the type of the film, the position of each film, and the position of each ink layer by using the space point data 221 and the optical data 229.

(i) Film Thickness (Paper Sheet Thickness)

It is noted in the film thickness measurement of the related art that the intensity of the reflected light (amount of light) varies in response to the thickness of a film. This is attributed to a phase difference between light reflected from the top surface of the film and light reflected from the bottom surface of the film. The reflected light detector 113 is designed to detect the phase difference. The 3D data generator 210 may compute the film thickness via such light interference (light interference method). The 3D data generator 210 may thus acquire information on the film thickness (paper sheet thickness) by using the space point data 221 and the optical data 229.

(ii) Type of Film

The paper sheet is greatly different in thickness from the ink layer. The type of film (film type) may thus be identified using the acquired information on the film thickness.

(iii) Position Information of Film

The information on the position of each film in the direction of thickness of the book 1 may be acquired by using the information on the film thickness in addition to the layout pattern identified by the layout pattern identifying unit 231. Specifically, information on the position of each of the air layer, the paper sheet, and the ink layer may be acquired in the direction of thickness at a position on the 2D surface in the book 1 (in the direction with the z value changing but with the x and y values fixed).

(iv) Position Information of Ink Layer

If the information on the position of each film is acquired, that information may be used as information indicating the location of the film of ink on a page of the book 1. The position information of the ink layer may thus be acquired.

Benefits

As described above, by using the space point data 221 and the optical data 229 correlated with the space point data 221, the 2D data generator 230 may increase the accuracy level and process speed of the process of identifying the page region and the process of identifying the position of the ink layer. The book digitization apparatus 10B of the second embodiment thus increases the efficiency of each process of the 2D data generator 230 to generate the 2D page data.

The 2D data generator 230 may extract only information related to the ink layer by acquiring the position information of each film (extract from the 3D data 2 only information of a portion in the book 1 where the ink film is present).

Process

Figure 10:
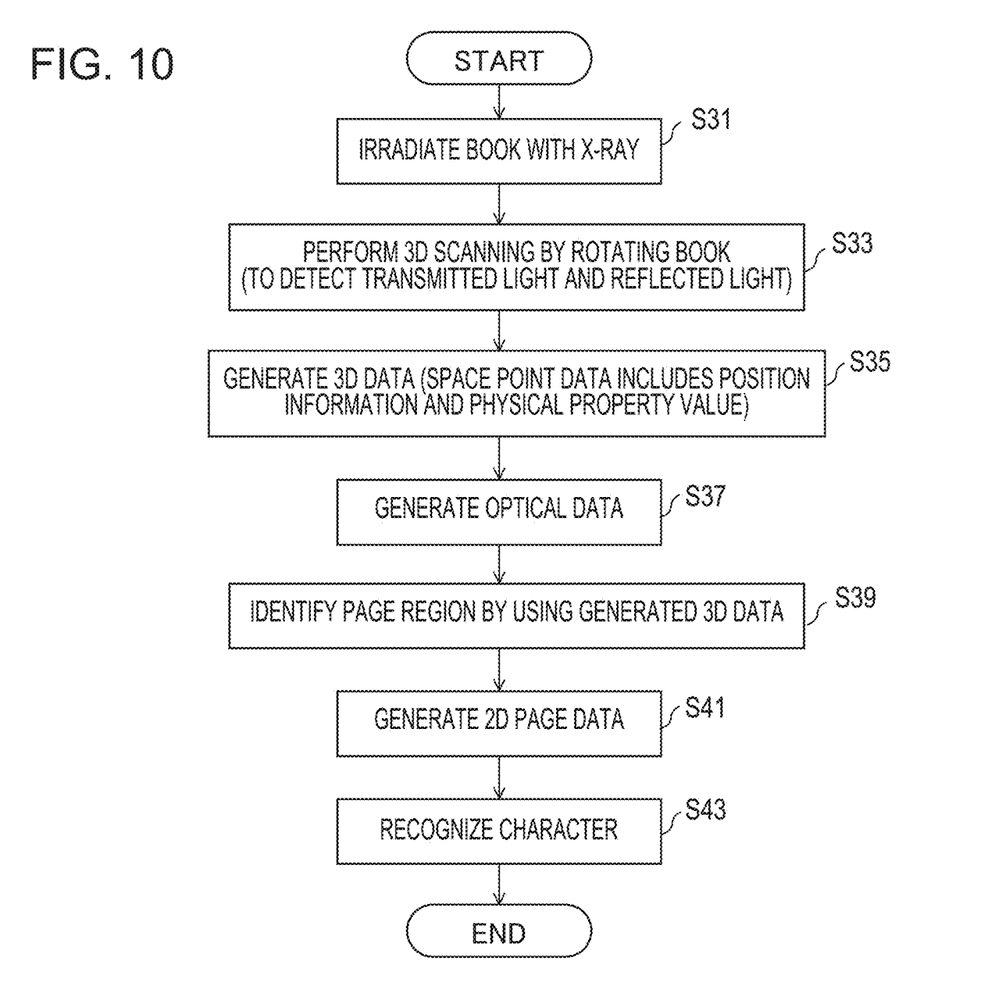
FIG. 10 is a flowchart illustrating a process performed by the book digitization apparatus.

FIG. 10 is a flowchart illustrating a process performed by the book digitization apparatus 10B. Referring to FIG. 10, the X-ray emitter 111 emits the X-ray (energy ray) to the book 1 in an emission operation (S31). The 3D scanning is performed with the book 1 rotated (S33). The 3D data generator 210 generates the 3D data 2 of the book 1 in accordance with the detected data (S35). The operations in S31, S33, and S35 are respectively identical to the operations in S11, S13, and S15 (see FIG. 7) of the first embodiment.

The data acquisition unit 122 generates the optical data 229 and stores the optical data 229 on the memory 220 (S37). The operation in S37 may be performed prior to or in parallel with the operation in S35.

By using the information on the reflectivity 227 included in the space point data 221, the layout pattern identifying unit 231 identifies the layout pattern of the air layer, the ink layer, and the paper sheet at a position in the 2D surface of the book 1 in the direction of thickness (in the direction with the z value changing but with the x and y values fixed).

The surface identifying unit 232 identifies the page region (S39). By using the 3D data 2 and the optical data 229, the surface identifying unit 232 may increase the accuracy level and the process speed of the process of identifying the interface between the air layer and the paper sheet layer. The page region is thus identified more accurately and faster.

The data generating unit 233 generates the 2D page data by using the 3D data 2, the information on the page region, the information on the identified layout pattern, and the optical data 229 (S41).

The data generating unit 233 identifies the position of the ink layer on the 2D surface in a page region (the position of the ink node NI). The position of the ink node NI may be identified more accurately by using the information on the reflectivity 227 included in the 3D data 2, the information on the layout pattern, and the optical data 229. The process speed may thus be increased.

The character recognition unit 240 recognizes characters in accordance with the 2D page data.

Third Embodiment

In accordance with the first and second embodiments, the book 1 is digitized by respectively using the book digitization apparatus 10A and the book digitization apparatus 10B. In a third embodiment of the disclosure, synchrotron radiation may be used as an X-ray source in book digitization. In a large-scale synchrotron radiation facility, the transmitted light detector 112, the reflected light detector 113, and the book holder 115 may be appropriately mounted, and the 3D scanning may be performed on a book by using synchrotron radiation X-ray. The data processing apparatus 200A or the data processing apparatus 200B may perform the process thereof in accordance with acquired information. The book digitization is thus performed.

Apparatus Implemented by Software.

Controls blocks (such as the controller 120, the 3D data generator 210, the 2D data generator 230, and the character recognition unit 240) in the book digitization apparatuses 10A and 10B may be implemented by hardware, such as a logic circuit formed on an integrated circuit (IC chip), or with software.

If the control blocks are implemented by software, each of the book digitization apparatuses 10A and 10B includes a computer that executes a program as software. The computer includes at least one processor (control device) and at least a computer-readable recording medium that stores the program. The processor reads the program from the recording medium and executes the read program. The processor may be a central processing unit (CPU). The recording medium may be a non-transitory physical medium, such as a read-only memory (ROM), magnetic tape, disc, card, semiconductor memory, or a programmable logic circuit. The recording medium may also be a random-access memory (RAM). The program may be supplied to the computer using a transmission medium (a communication network or a broadcasting wave) able to transmit the program. In one embodiment of the disclosure, the program may be electronically implemented in the form of a data signal conveyed by a carrier wave.

According to a first aspect of the disclosure, there is provided a book digitization apparatus. The book digitization apparatus includes an emitter that applies an energy ray to a book, a detector that detects an energy ray radiated from the book in response to a material existing in the book, and a three-dimensional data generator that generates data of a plurality of space points in accordance with the detected energy ray. The data of the space points associates position information of a position in a three-dimensional space within the book with a physical property value used to identify a layout pattern of the material at the position in a direction of thickness of the book.

In the book digitization apparatus of a second aspect of the disclosure in view of the first aspect, the physical property value may include a value of reflectivity of the material in response to an application of the energy ray.

In the book digitization apparatus of a third aspect of the disclosure in view of the second aspect, the physical property value may further include a value of absorptivity of the material in response to the application of the energy ray.

The book digitization apparatus of a fourth aspect of the disclosure in view of one of the first through third aspects may further include a two-dimensional data generator that generates two-dimensional page data of the book by using the data of the space points.

In the book digitization apparatus of a fifth aspect of the disclosure in view of the fourth aspect, the three-dimensional data generator may further generate optical data correlated with the data of the space points that is used to identify the layout pattern in accordance with the radiated energy ray. The optical data may include interface identifying information that is used to identify each interface between layers in a layer structure of the book, and the two-dimensional data generator may generate the two-dimensional page data of the book by using the data of the space points and the optical data.

In the book digitization apparatus of a sixth aspect of the disclosure in view of the fifth aspect, the interface identifying information may include at least one of a value of interface reflectivity value, a value of overall absorptivity value, and an incidence angle.

In the book digitization apparatus of a seventh aspect of the disclosure in view of one of the firth through sixth aspects, the detector may include a first detection unit that detects an energy ray transmitted through and radiated from the book and a second detection unit that detects an energy ray reflected and radiated from the material via the book.

According to an eighth aspect of the disclosure, there is provided a book digitization method. The book digitization method includes applying an energy ray to a book, detecting an energy ray radiated from the book in response to a material existing in the book, and generating three-dimensionally data of a plurality of space points in accordance with the detected ray. The data of the space points associates position information of a position in a three-dimensional space within the book with a physical property value used to identify a layout pattern of the material at the position in a direction of thickness of the book.

The book digitization apparatus of each of the embodiments may be implemented using a computer. By causing the computer to operate as each element (software element) of the book digitization apparatus, the book digitization apparatus is implemented by the computer. A control program of the book digitization apparatus and a computer-readable recording medium storing the control program fall within the scope of the disclosure.

The present disclosure contains subject matter related to that disclosed in Japanese Priority Patent Application JP 2018-119949 filed in the Japan Patent Office on Jun. 25, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A book digitization apparatus comprising:
   an emitter that applies an energy ray to a book;
   a detector that detects an energy ray radiated from the book in response to a material existing in the book;
   a three-dimensional data generator that generates data of a plurality of space points in accordance with the detected energy ray, wherein the data of the space points associates position information of a position in a three-dimensional space within the book with a physical property value used to identify a layout pattern of the material at the position in a direction of thickness of the book; and
   a two-dimensional data generator that generates two-dimensional page data of the book by using the data of the space points, wherein
   the physical property value comprises a value of reflectivity of the material in response to an application of the energy ray, and
   the two-dimensional data generator includes:
      a layout pattern identifying unit that identifies the layout pattern of the material in the direction of thickness of the book by using the physical property value;
      a surface identifying unit that identifies a page region by searching for an equal-value plane by using the data of the space points; and
      a data generating unit that generates the two-dimensional page data by using the data of the space points, information on the page region, and information on the layout pattern.

2. The book digitization apparatus according to claim 1, wherein the physical property value further comprises a value of absorptivity of the material in response to the application of the energy ray.

3. The book digitization apparatus according to claim 1, wherein the three-dimensional data generator further generates optical data correlated with the data of the space points that is used to identify the layout pattern in accordance with the radiated energy ray,
   wherein the optical data comprises interface identifying information that is used to identify each interface between layers in a layer structure of the book; and
   wherein the two-dimensional data generator generates the two-dimensional page data of the book by using the data of the space points and the optical data.

4. The book digitization apparatus according to claim 3, wherein the interface identifying information comprises at least one of a value of interface reflectivity, a value of overall absorptivity, and an incidence angle.

5. The book digitization apparatus according to claim 1, wherein the detector comprises a first detection unit that detects an energy ray transmitted through and radiated from the book and a second detection unit that detects an energy ray reflected and radiated from the material via the book.

6. A book digitization method comprising:
   i) applying an energy ray to a book;
   ii) detecting an energy ray radiated from the book in response to a material existing in the book;
   iii) generating three-dimensionally data of a plurality of space points in accordance with the detected energy ray, wherein the data of the space points associates position information of a position in a three-dimensional space within the book with a physical property value used to identify a layout pattern of the material at the position in a direction of thickness of the book; and
   iv) generating two-dimensional page data of the book by using the data of the space points, wherein
   the physical property value comprises a value of reflectivity of the material in response to an application of the energy ray, and
   step iv) includes:
      identifying the layout pattern of the material in the direction of thickness of the book by using the physical property value;
      identifying a page region by searching for an equal-value plane by using the data of the space points; and
      generating the two-dimensional page data by using the data of the space points, information on the page region, and information on the layout pattern.

7. A control program causing a computer to operate as the book digitization apparatus according to claim 1, wherein the control program causes the computer to operate as the three-dimensional data generator.

* * * * *